United States Patent
Tessler et al.

(10) Patent No.: US 12,549,666 B2
(45) Date of Patent: Feb. 10, 2026

(54) COMPUTER-BASED SYSTEMS AND/OR COMPUTING DEVICES CONFIGURED FOR BULK ADDING AND/OR UPDATING OF TRUSTED AND NON-TRUSTED CONTACTS TO A PHONE CONTACTS LIST TO PREVENT VISHING; AND METHODS OF USE THEREOF

(71) Applicant: Capital One Services, LLC, McLean, VA (US)

(72) Inventors: Leeyat Bracha Tessler, Arlington, VA (US); Abhay Donthi, Washington, DC (US); Salik Shah, Washington, DC (US); Jennifer Kwok, Brooklyn, NY (US); Dwij Trivedi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 449 days.

(21) Appl. No.: 18/159,908

(22) Filed: Jan. 26, 2023

(65) Prior Publication Data
US 2024/0259492 A1  Aug. 1, 2024

(51) Int. Cl.
*H04M 3/42* (2006.01)
*H04M 3/22* (2006.01)
*H04M 3/436* (2006.01)

(52) U.S. Cl.
CPC ..... *H04M 3/42059* (2013.01); *H04M 3/2281* (2013.01); *H04M 3/436* (2013.01); *H04M 2203/6027* (2013.01)

(58) Field of Classification Search
CPC .......... H04M 3/42059; H04M 3/2281; H04M 3/436; H04M 2203/6027
See application file for complete search history.

(56) References Cited

U.S. PATENT DOCUMENTS

| | | | |
|---|---|---|---|
| 8,417,291 B2 | 4/2013 | Lim | |
| 9,807,218 B2 | 10/2017 | Park et al. | |
| 10,409,829 B2 | 9/2019 | Pappalardo et al. | |
| 2003/0051133 A1* | 3/2003 | Pearson | H04M 1/57 713/155 |
| 2005/0015455 A1 | 1/2005 | Liu | |
| 2006/0095397 A1* | 5/2006 | Torres | G06F 16/958 |

(Continued)

FOREIGN PATENT DOCUMENTS

CN 102480568 A 5/2012

*Primary Examiner* — Santiago Garcia
(74) *Attorney, Agent, or Firm* — Greenberg Traurig, LLP

(57) ABSTRACT

A method includes generating a set of non-trusted contacts, each contact of the set of non-trusted contacts corresponding to contact information believed to be associated with vishing attacks. The method further includes sending the set of non-trusted contacts to a computing device of a user. The computing device is configured to add the set of non-trusted contacts to a contacts list associated with an audio calling functionality of the computing device. The computing device is configured to receive a call and determine that the call is from a caller associated with a contact in the set of non-trusted contacts. The computing device is configured to silence the call, block the call, or display caller information of the contact based on the determination that the call is from the caller associated with the contact in the set of non-trusted contacts.

19 Claims, 10 Drawing Sheets

(56) References Cited

U.S. PATENT DOCUMENTS

| | | | |
|---|---|---|---|
| 2014/0282371 A1* | 9/2014 | Hirsch | G06F 8/65 |
| | | | 717/106 |
| 2016/0100050 A1* | 4/2016 | VanBlon | H04W 4/16 |
| | | | 455/415 |
| 2017/0111498 A1* | 4/2017 | Cody | H04M 3/42042 |
| 2017/0118279 A1 | 4/2017 | Engbersen et al. | |
| 2018/0241848 A1 | 8/2018 | Walls et al. | |
| 2018/0338039 A1* | 11/2018 | Cody | H04M 1/575 |
| 2020/0389551 A1* | 12/2020 | Vaughn | H04M 3/42059 |
| 2021/0193174 A1* | 6/2021 | Enzinger | G10L 17/00 |
| 2021/0306456 A1* | 9/2021 | Kanagala | H04M 3/4365 |
| 2021/0367954 A1* | 11/2021 | Daga | H04L 63/0838 |
| 2022/0103681 A1* | 3/2022 | Prodanovic | H04L 67/00 |
| 2022/0263942 A1* | 8/2022 | Hamilton | H04M 3/42042 |
| 2024/0236232 A1* | 7/2024 | De | H04M 3/42042 |

* cited by examiner

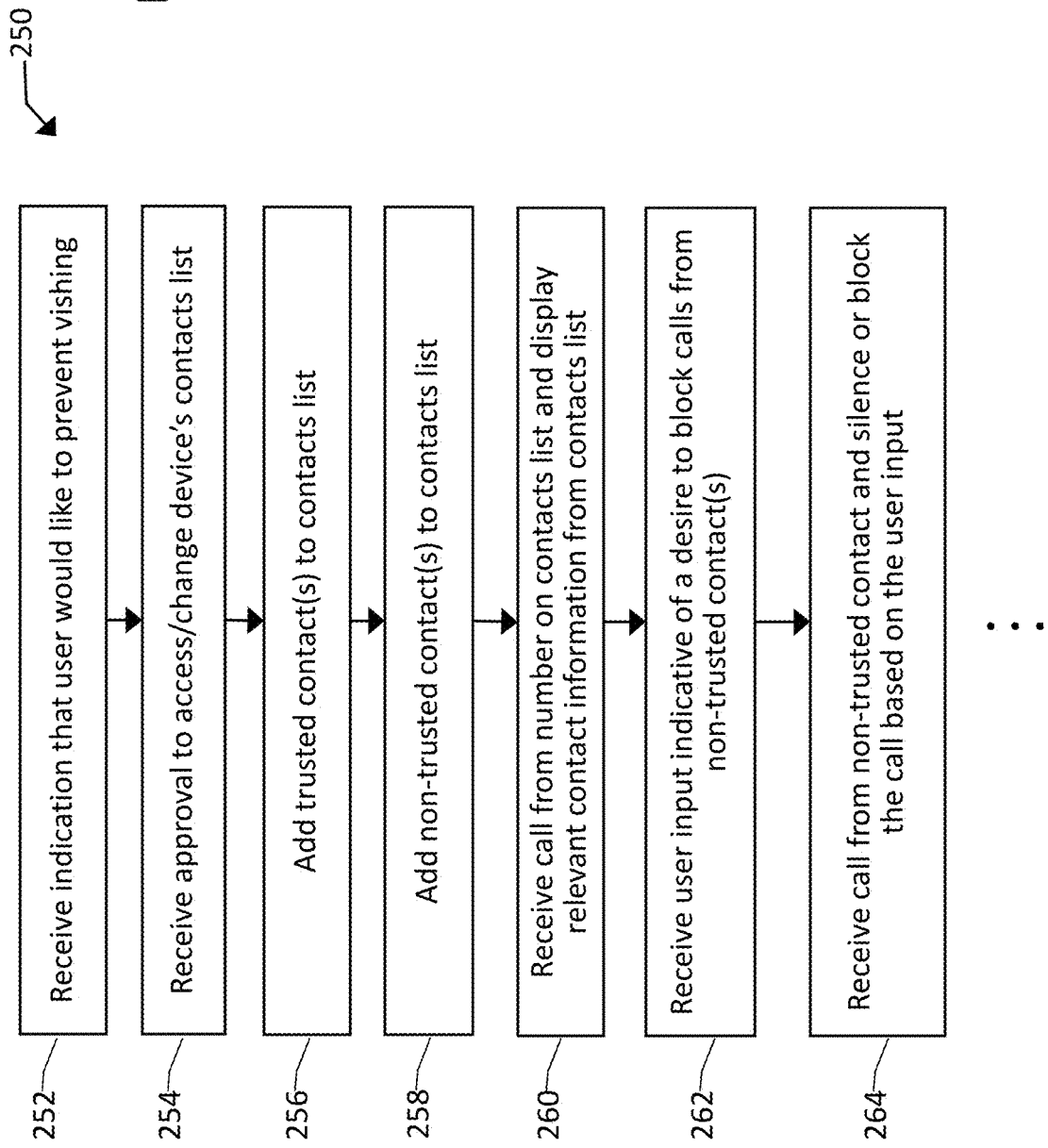

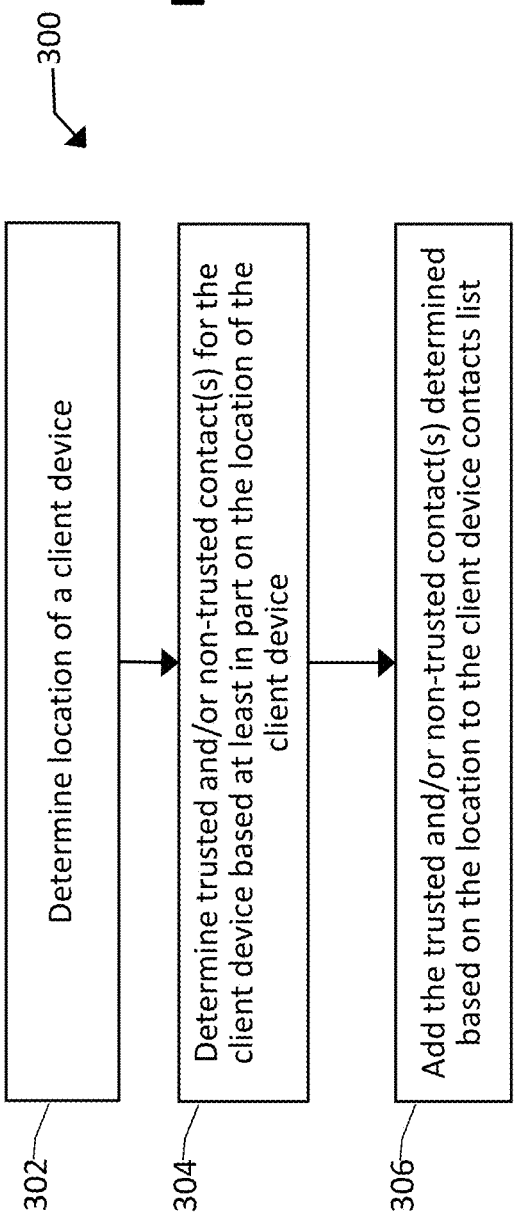

COMPUTER-BASED SYSTEMS AND/OR COMPUTING DEVICES CONFIGURED FOR BULK ADDING AND/OR UPDATING OF TRUSTED AND NON-TRUSTED CONTACTS TO A PHONE CONTACTS LIST TO PREVENT VISHING; AND METHODS OF USE THEREOF

TECHNICAL FIELD

The present disclosure generally relates to computer-based methods and systems for bulk adding and/or updating of trusted and non-trusted contacts to a phone contacts list to prevent vishing and methods of use thereof, such that a client device may use its own contacts list to prevent attempted vishing.

BACKGROUND

A computer network platform/system may include a group of devices (e.g., client devices (e.g., laptops, desktop computers, tablets, smartphone devices, internet of things (IoT) devices, etc.), servers, wireless routers or other networking devices) and other computing hardware devices that are linked together through one or more communication channels to facilitate communication and/or resource-sharing, including for placing audio calls through a traditional public-switched telephone network (PSTN) and/or through voice over internet protocol (VoIP).

SUMMARY

In some embodiments, the present disclosure provides an exemplary technically improved computer-based method that includes at least generating, by one or more processors of a computer system, a set of non-trusted contacts, each contact of the set of non-trusted contacts corresponding to contact information believed to be associated with vishing attacks. The method further includes sending, by the one or more processors, the set of non-trusted contacts to a computing device of a user. The computing device is configured to add the set of non-trusted contacts to a contacts list of the computing device, the contacts list being associated with an audio calling functionality of the computing device. The computing device is further configured to receive a call and determine that the call is from a caller associated with a contact in the set of non-trusted contacts. The computing device is further configured to silence the call, block the call, or display caller information of the contact based on the determination that the call is from the caller associated with the contact in the set of non-trusted contacts.

In some embodiments, the present disclosure provides an exemplary technically improved computer-based system that includes at least the following components of a memory and at least one processor coupled to the memory. The processor is configured to receive a set of trusted contacts and a set of non-trusted contacts. Each contact of the set of trusted contacts corresponds to legitimate contact information associated an entity associated with a computing device from which the set of trusted contacts and the set of non-trusted contacts is received. Each contact of the set of non-trusted contacts corresponds to contact information not associated with the entity. The processor is further configured to add the set of trusted contacts and the set of non-trusted contacts to a contacts list of the apparatus stored in the memory, the contacts list being associated with an audio calling functionality of the apparatus. The processor is further configured to receive a first call and determine that the first call is from a first caller associated with a contact in the set of trusted contacts. The processor is further configured to display first caller information of the first contact based on the determination that the first call is from the first caller associated with the contact in the set of trusted contacts. The processor is further configured to receive a second call and determine that the second call is from a second caller associated with a contact in the set of non-trusted contacts. The processor is further configured to silence the second call, block the second call, or display second caller information of the contact in the set of non-trusted contacts based on the determination that the second call is from the second caller associated with the contact in the set of non-trusted contacts.

In some embodiments, the present disclosure provides an exemplary technically improved non-transitory computer readable medium having instructions stored thereon that, upon execution by a computing system, cause the computing system to perform operations including generating a set of trusted contacts, each contact of the set of trusted contacts corresponding to legitimate contact information associated with an entity associated with the computing system. The instructions further cause the computing system to perform operations including generating a set of non-trusted contacts, each contact of the set of non-trusted contacts corresponding to contact information not associated with the entity. The instructions further cause the computing system to perform operations including storing the set of trusted contacts and the set of non-trusted contacts at one or more electronic storage devices. The set of trusted contacts and the set of non-trusted contacts are configured to be updated at the one or more electronic storage devices. The instructions further cause the computing system to perform operations including sending the set of trusted contacts and the set of non-trusted contacts to a computing device of a user. The computing device is configured to add the set of trusted contacts and the set of non-trusted contacts to a contacts list of the computing device, the contacts list being associated with an audio calling functionality of the computing device. The computing device is further configured to receive a first call and determine that the first call is from a first caller associated with a first contact in the set of trusted contacts. The computing device is further configured to display first caller information of the first contact based on the determination that the first call is from the first caller associated with the first contact in the set of trusted contacts. The computing device is further configured to receive a second call and determine that the second call is from a second caller associated with a first contact in the set of non-trusted contacts. The computing device is further configured to silence the second call, block the second call, or display second caller information of the second contact based on the determination that the second call is from the second caller associated with the second contact in the set of non-trusted contacts.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 1 is a diagram illustrating a system for bulk adding and/or updating of trusted and non-trusted contacts to a phone contacts list to prevent vishing in accordance with one or more embodiments of the present disclosure.

FIG. 2 is a flowchart illustrating a process for bulk adding and/or updating of trusted and non-trusted contacts to a phone contacts list to prevent vishing in accordance with one or more embodiments of the present disclosure.

FIG. 3 is a flowchart illustrating a process for using a location determination for bulk adding and/or updating of trusted and non-trusted contacts to a phone contacts list in accordance with one or more embodiments of the present disclosure.

DETAILED DESCRIPTION

Figure 1:
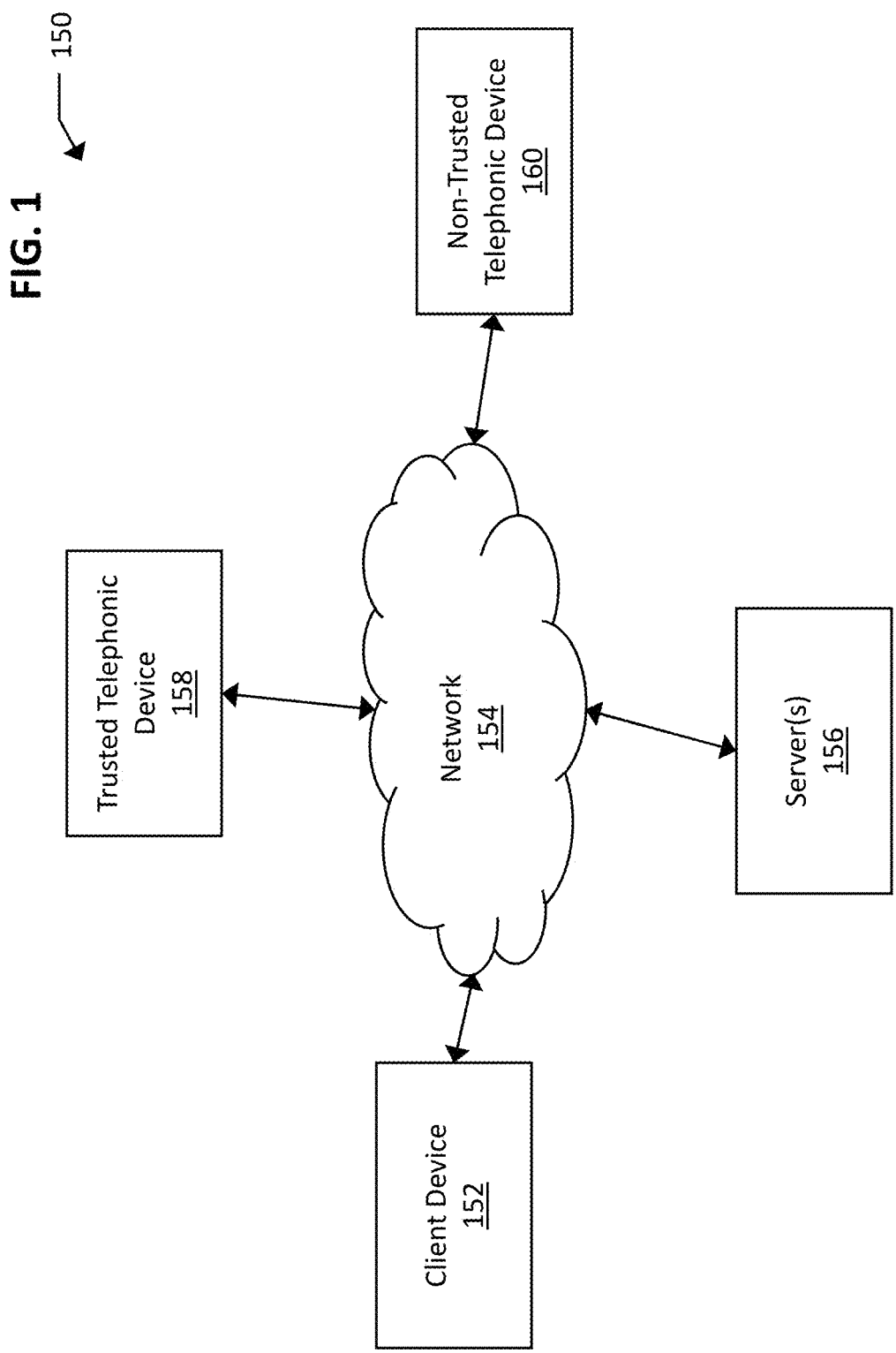

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX the ye, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for bulk adding and/or updating of trusted and non-trusted contacts to a phone contacts list to prevent vishing. In this way, for example, user client devices (e.g., smartphones) may have improved capabilities for spam prevention and defense against vishing attacks (e.g., callers impersonating a legitimate entity who convince customers to divulge confidential, personal, and/or financial information). By updating user client devices with non-trusted contact information (e.g., phone numbers) of known or suspected spam or vishing attack phone numbers, users and/or their client devices may be better able to recognize a spam or vishing call. A set of non-trusted and/or trusted contacts may therefore be stored on a user client device, may be cloud-based, etc., and may be periodically or continuously updated so that a user client device may have up to date information about potential spam or vishing attack contacts, as well as up to date information about trusted contacts (e.g., legitimate phone numbers associated with an entity). The trusted and non-trusted contact information may be bulk added to a user client device at once and may store multiple numbers as part of a single contact on the user client device, so that a large number of trusted and/or non-trusted contacts may be added to or made accessible to a user client device in an efficient manner. The user client device may then be able to recognize a trusted contact when a call received and let the call through, and/or may recognize a non-trusted contact when a call is received to identify that non-trusted contact, block the call, silence the call, etc.

In an example, the methods, systems, computer readable media, etc. may provide an improved way for computing devices with phone calling capabilities to detect and subsequently block, silence, and/or identify calls from a non-trusted entity, such as individuals or entities seeking to scam vulnerable persons by gaining possession of valuable personal or financial information from the vulnerable persons. Users and their devices may have trouble identifying calls and texts from numbers that may be malicious. For example, vishing attacks may occur by spammers using a phone number that is one digit different from a legitimate number (e.g., a company's customer service number) in order to trick users into believing that a call from the spammer is associated with the legitimate entity. By implementing the embodiments described herein, an improved technical process for updating computing devices to recognize non-trusted individuals or entities is also provided. This is important because scammers and spammers who engage in vishing attacks often change phone numbers, spoof different phone numbers, etc. Thus, the solutions herein provide for continuous updating of non-trusted contacts listed in or available to a user's client device. As such, the embodiments described herein provide a technical solution to a technical problem presented by vishing attacks constantly using different phone numbers to try to reach potential victims.

As such, the methods, systems, and computer readable media described herein provide the technical improvement to user client devices to more accurately and to more often identify calls and/or text messages from non-trusted individuals or entities that may be scammers. The methods, systems, and computer readable media described herein also provide the technical improvement to user client devices to more accurately and to more often identify calls and/or text messages from trusted individuals or entities that may be associated with an entity that the individual owning a client device is associated with (e.g., a bank of the individual, an online shopping account, an email account, any other online account, a governmental entity, etc.).

The various embodiments described herein therefore provide improved technical solutions for various technical problems that occur in previous methods for detecting and stopping spammers or vishing attacks. The bulk adding of trusted and/or non-trusted contacts to a user's client device or otherwise making the contacts available to the user's client device allows the client device to determine both trusted and non-trusted incoming phone calls, which represents technical aspects that provide a significant technical advantage over prior systems that do not provide such functionality. Additional technical advantages of the embodiments described herein includes the ability to update such trusted and non-trusted contacts so that a user's client device may be able to stop spam calls from new phone numbers spammers are using, and the user's client device may be updated with new phone numbers a spammer may use when a user becomes associated with a new entity. For example, if the user enrolls in a new university and/or opens an account with a new entity, website, financial institution, etc., the various departments of that university/entity (e.g., customer service, finance, etc. departments) may have different phone numbers than prior entities the user had accounts with or was otherwise associated with. As such, the user's client device may also be updated with new trusted and non-trusted contacts based on a determination that the user has a new account or entity they are associated, and a computing system may thereby determine both new trusted and non-trusted numbers to add to the user's client device contacts list-representing a technical improvement over prior systems that solves a technical problem present in prior systems where a user's device will not know trusted or non-trusted contacts associated with a user signing up for a new account or becoming associated with a new entity.

In various embodiments, different aspects are described with respect to FIGS. 9-12 that are described in further detail below. Any combination of the various computing components and aspects of FIGS. 9-12 may be used various embodiments described herein. For example, users' client devices on which trusted and/or non-trusted contacts may be bulk added, changed, etc. or otherwise made available to users' client devices may be any of client devices 102, 103, 104, or 202*a* through 202*n* as described herein. As another example, the devices facilitating the bulk adding, updating, changing, etc. of the trusted and non-trusted contacts, including maintaining lists of the trusted and non-trusted contacts to be made available to client devices may be any of the server devices 106, 107, 204, or 213; network databases 207 or 215; and/or one or more cloud components 225 that communicate with the client devices through the networks 105 or 206. In various embodiments, calls may be routed through any of the server devices 106, 107, 204, or 213; the network databases 207 or 215; and/or the one or more cloud components 225 such that these devices may also function to identify, block, silence, etc. any calls from a trusted or non-trusted contact as described herein (e.g., where a thin client is run on a user device and processing related to any of embodiments described herein may be executed or implemented at a device other than a client device).

In various embodiments, any of the client devices 102, 103, 104, or 202*a* through 202*n* may additionally or alternatively be used to implement or execute the methods or processes described herein, such as those described herein with respect to a database, server, cloud service/server, etc. (e.g., a client device may store trusted or non-trusted contacts on its memory and facilitate the bulk adding or updating of those trusted or non-trusted contacts to any of the other devices in FIGS. 9-12, including any client devices, servers, databases, cloud servers/services, etc.). In any event, one or more of the computing devices, systems, etc. may be in communication with any or all of the other devices shown in FIGS. 9-12 to implement the systems and methods described herein.

For example, client device 102 may receive a bulk group of trusted and non-trusted contacts from the network server 106, which may be associated with a financial institution where a user of the client device 102 has an account. The trusted and non-trusted contacts on the client device 102 may further be updated over time by receiving additional information from the network server 106. The client device 102 may receive a phone call or text message from any of the client device 103, client device 104, and/or network server 107. The client device 102 may use the trusted and non-trusted contact information received from the network server 106 to determine if the caller is trusted or non-trusted and react accordingly (e.g., block a non-trusted contact, allow a call from a trusted contact). In various embodiments, the network 105 may be a public switched telephone network (PSTN), an internet network, cellular network, any other type of network capable of facilitating text messages or voice calls, or any combination thereof. In such an example, the client devices 102 and 104 may communicate with the network server 107 via the network 105. The components shown in FIGS. 9-12 are described in greater detail below after the discussions of FIGS. 1-8 below.

FIG. 1 is a diagram illustrating a system 150 for bulk adding and/or updating of trusted and non-trusted contacts to a phone contacts list to prevent vishing in accordance with one or more embodiments of the present disclosure. The network 154 may be a public switched telephone network (PSTN), an internet network, cellular network, any other type of network capable of facilitating text messages or voice calls, or any combination thereof. In this way, any types of phone calls (e.g., voice over internet protocol (VoIP), over a PSTN), text messages, etc. may be communicated between devices. In various embodiments, some devices of FIG. 1 may be in communication only through a first type of network (e.g., client device 152 and server 156 may be connected only through the internet, client device 152 and trusted telephonic device 158 may be connected only via a PSTN), while other devices may be connected through one or more types of networks (e.g., client device 152 is connectable to a WiFi network, the internet, a PSTN, a cellular network, etc. such that a call routed through, in whole or in part, any of those networks may be received by the client device 152).

Thus, the client device 152 may be the user's device where trusted and non-trusted contacts are bulk added from the server 156. The server may store, for example, a master list of the trusted and non-trusted contacts, and may periodically push updates to the client device 152 or may send updates when requested by the client device 152. In this way, when the trusted telephonic device 158 or the non-trusted telephonic device 160 place a call to the client device 152, the call may be identified according to the bulk contacts added to the client device 152. The client device may then silence, block, identify, etc. a call based on the information in the client device 152's own contacts list. In various embodiments, the server 156 may be a cloud server to which the client device 152 periodically or continuously (or near-continuously) syncs. In such embodiments, the trusted and non-trusted contacts may be stored, for example, on the server 156 and accessed by the client device 152 (e.g., whenever a call is received for the client device 152). Similarly, calls may be routed having an endpoint of the client device 152, but in various embodiments may be first routed to the server 156 first, so that the server 156 may compare the call (e.g., telephone number of the caller) to the trusted and non-trusted contacts stored at the server 156. In this way, the server 156 may determine whether to suppress/block the call (e.g., not finish the routing of the call to the client device 152 so that, from the client device 152's perspective, a call was never received). In such embodiments, the trusted and/or non-trusted contacts may never be added to the client device 152 itself, but may instead reside on the server 156 and be used there to block or allow calls to reach the client device.

FIG. 2 is a flowchart illustrating a process 200 for bulk adding and/or updating of trusted and non-trusted contacts to a phone contacts list to prevent vishing in accordance with one or more embodiments of the present disclosure. At an operation 252, a client device may receive an indication that a user would like to prevent vishing or spam calls, which may take the form of a user input through a user interface (e.g., a touch screen of a smartphone as further shown in and described with respect to FIG. 4). In various embodiments, a client device may further receive an second input indicating that a user would like to also add trusted contacts to their client device.

Figure 5:
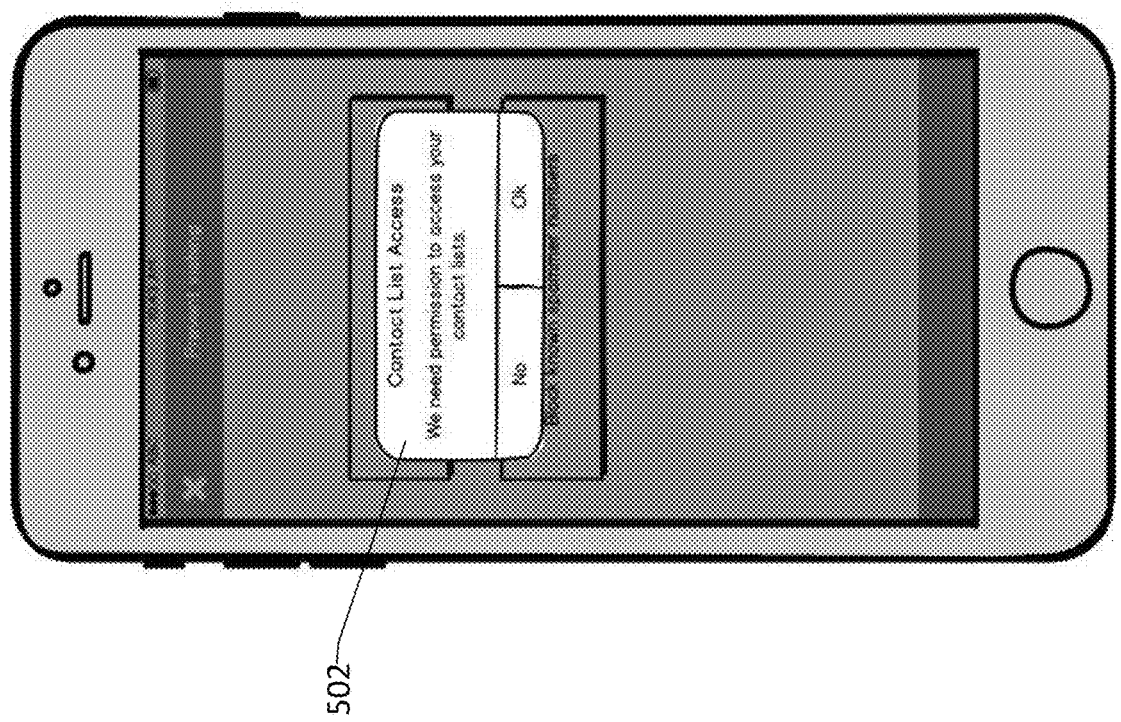
FIG. 5 is a diagram illustrating an example interface for receiving a user input for providing permission to an application to change and/or access a phone contacts list in accordance with one or more embodiments of the present disclosure.

At an operation 254, the client device may receive approval to access, modify, change, etc. the client device's contacts list. For example, many smart phones may have operating systems (e.g., iOS, Android) that have built in apps like a contacts list, where names, phone numbers, etc. may be stored to supplement phone calling capabilities of the smart phones. Smart phones may also have other applications (apps) that may be downloaded and/or used by a user for various functions. For example, a user may download an app related to an online or other type of account they may have (e.g., email address, financial institution, online shopping account, etc.) and that app may interact with and use other aspects available on the smart phone, including a contacts list of the smart phone. On many smart phones, for a downloaded app related to an entity that is not the smart phone maker or operating system provider, the downloaded app must receive express permission from a user before aspects available to downloaded apps on the smart phone can actually use those aspects such as contacts lists. As such, the operation 254 relates to seeking and receiving that express permission from a user for a downloaded app to access, modify, etc. a contacts list to add trusted and/or non-trusted contacts. In this way, for example, a banking app of the client device may seek permission to add trusted and or non-trusted contacts from lists maintained by a bank's server to the client device via communication between the bank's app on the smart phone and the bank's server. FIG. 5 shows an example user interface where permission may be received for an app to access/modify a contacts list on a smart phone.

Figure 7:
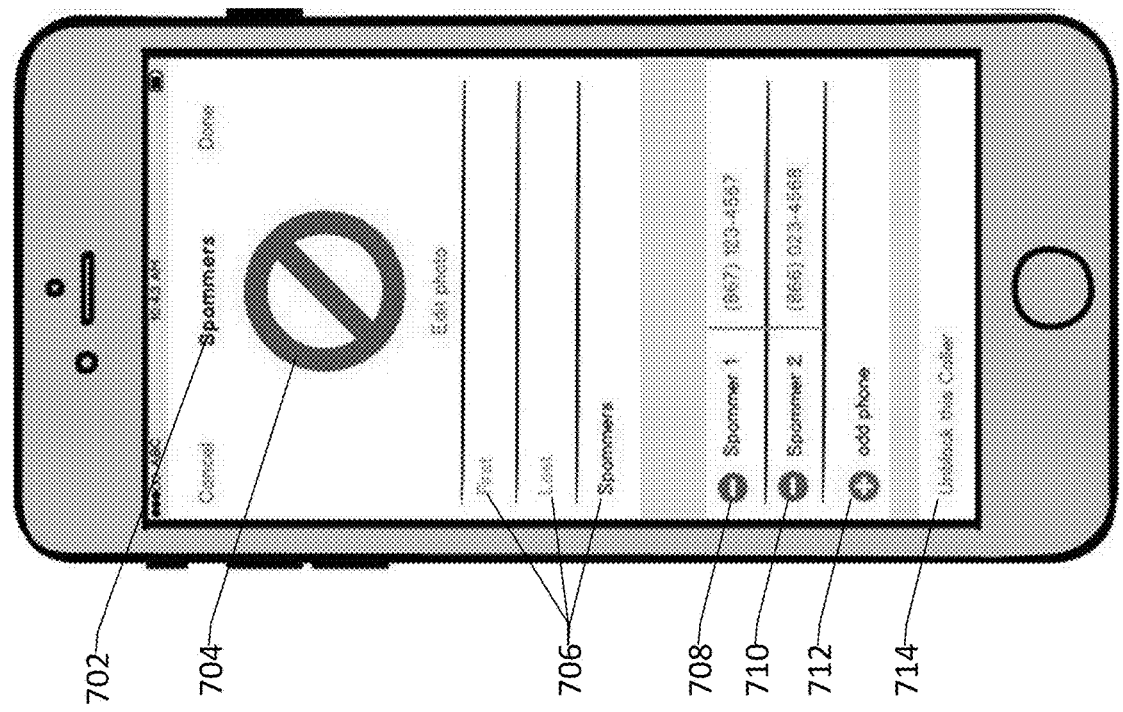
FIG. 7 is a diagram illustrating an example interface for bulk adding non-trusted contacts to a phone contacts list in accordance with one or more embodiments of the present disclosure.
Figure 6:
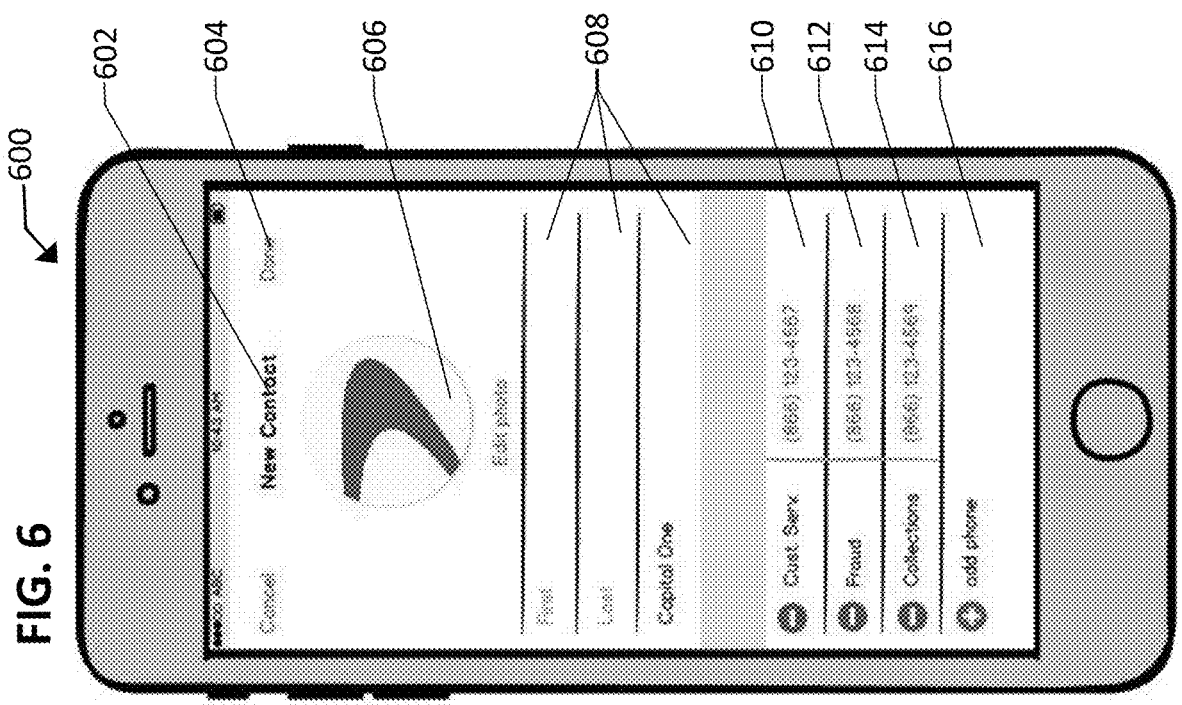
FIG. 6 is a diagram illustrating an example interface for bulk adding trusted contacts to a phone contacts list in accordance with one or more embodiments of the present disclosure.

At an operation 256, the trusted contacts themselves may be added to the contacts list on the user's client device (e.g., from a server based on communication between the client device and the server via a downloadable app, where the downloadable app modifies the contacts list to include the trusted and non-trusted contacts). At an operation 258, the non-trusted contacts may be added to the contacts list on the user's client device (e.g., from a server based on communication between the client device and the server via a downloadable app, where the downloadable app modifies the contacts list to include the trusted and non-trusted contacts). Examples of a trusted contact and non-trusted contact being added to a contacts list are shown in FIGS. 6 and 7, respectively.

At an operation 260, a call may be received at the client device from a number that has been saved in/associated with a contact in the contacts list. In various embodiments, the client device may display the relevant contact information from the contacts list regardless of whether it is from a trusted or non-trusted contact. In such embodiments, a user may be able to see whether the call is from a trusted or non-trusted contact based on the contact information being displayed on the user's client device (e.g., where contacts such as those of FIGS. 6 and 7 have been added to a client device's contacts list). In other various embodiments, calls from non-trusted contacts may be blocked by a client device (e.g., the device/phone never rings and call information is never displayed on the device), calls may be silenced (e.g., call information about the non-trusted contact is displayed by the device, but the device/phone does not ring with an audio speaker or other vibration, etc. In various embodiments, the client device may or may not display missed calls from a non-trusted contact in its call log.

At an operation 262, a user input may be received that is indicative of a user's desire to block calls from non-trusted contacts. This input may be received via a user interface, such as that shown in FIG. 7. In this way, at an operation 264, a call from a non-trusted contact may be silenced or blocked as desired by user as indicated by their user input. In other embodiments, a client device may automatically block or silence a call without the express input of a user, as a downloaded app for example may modify or save non-trusted contacts to a contact list to automatically be blocked or silenced by a client device without a separate input from a user as described in the operation 262.

FIG. 3 is a flowchart illustrating a process 300 for using a location determination for bulk adding and/or updating of trusted and non-trusted contacts to a phone contacts list in accordance with one or more embodiments of the present disclosure. At an operation 302, a determination may be made of a location of a client device. For example, the client device itself may have geolocation capabilities such as global positioning system (GPS), or other geolocation functionality to identify a location of the client device. As another example, the client device may interact with other electronic devices, such that a location of the client device may be inferred by either the client device or another device (e.g., server). For example, interaction by the client device with a WiFi or Bluetooth device or network in a given location may enable an inference that the client device is in or near that location. In another example, a user known to be associated with a client device may be determined to be in a particular location. For example, a user may use an automatic teller machine (ATM) card at an ATM or at a physical bank branch. A server may determine, based on that use of an ATM, that the user and their client device may be present at the ATM or physical bank branch. In any case, at the operation 302, a user and/or their client device may be determined to be at a specific location (e.g., at a specific building, address, or coordinates) and/or at a more general location (e.g., within a certain zip code, municipality, state, country, area code region, etc.). In another example, an area code of a device may be used to infer a general location of the device.

At an operation 304, the trusted or non-trusted contacts may be determined for sending to or making available to the client device based at least in part on a location determined at the operation 302. Some spammers may target users based on their physical location, or certain spam numbers may be more likely to call client devices in certain locations or having certain area codes. Similarly, some trusted contacts may be more likely to call a client device than others (e.g., a local bank branch or customer service center servicing a designated region may be more likely to call a client in their area). As such, it may be beneficial to determine certain non-trusted and/or trusted contacts based on an actual or inferred location of a given client device.

At an operation 306, those trusted or non-trusted contacts determined at the operation 304 may be added to the client device. The operation 306 may be performed, for example, using some or all of the operations described herein with respect to FIG. 2.

In various embodiments, the location of a client device may be used for other functions than merely determining trusted and non-trusted contacts to add to that client device. For example, if a client device is determined to be at a brick-and-mortar location of an entity providing the trusted and/or non-trusted contacts (e.g., if the client device is sensed via communication with a WiFi or Bluetooth device, if the client uses their ATM card at the location, etc.), a message may be triggered to be sent to a computing device at the brick-and-mortar location, where the message may be seen by, for example, an employee of the entity. That message may indicate that the user or client has not previously saved any trusted or non-trusted contacts from the entity on their client device. As such, the message may further indicate that an employee of the entity may offer to help the user/client load trusted and/or non-trusted contacts onto their device and answer any questions about the process the user/client may have. This may be advantageous where, for example, the user/client may not have a smart phone or may not have downloaded the entity's app, so trusted and/or non-trusted contacts may be loaded on to the user's telephonic device in another manner (e.g., through a hard-wire connection to another device, through some other data connection to the phone wirelessly, through manual adding of contact numbers, etc.). In this way, users/clients who may be less sophisticated and thereby more susceptible to vishing attacks may be identified and assisted to add trusted and non-trusted contacts to their client devices.

Figure 4:
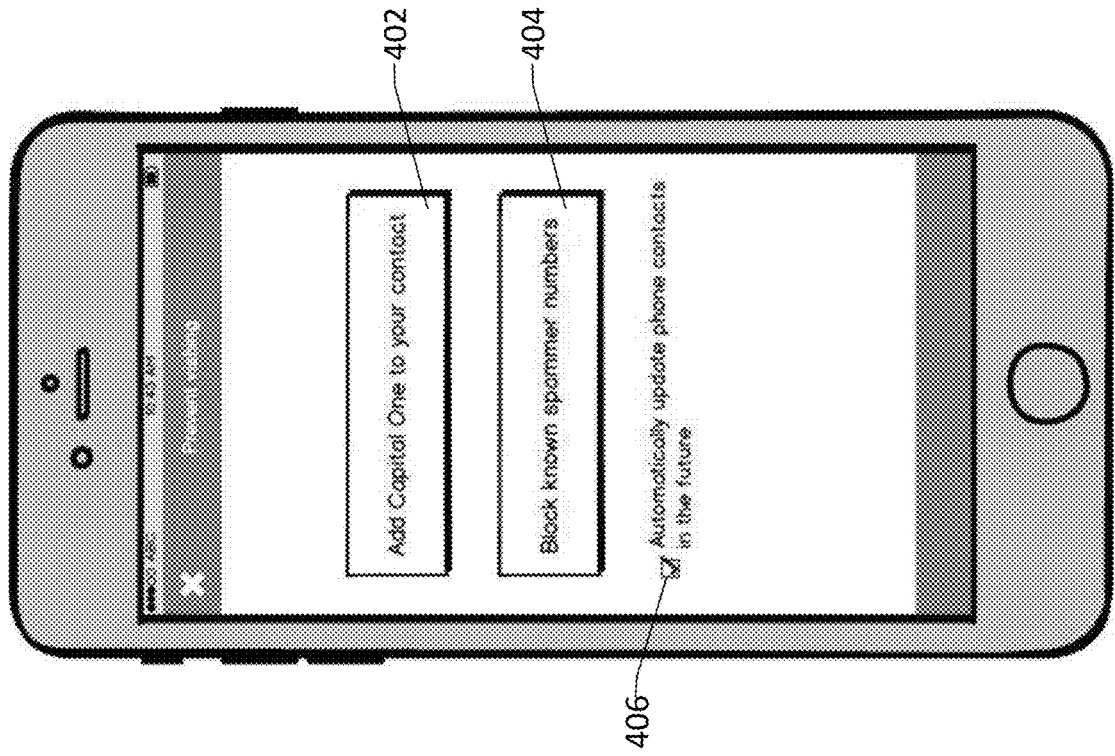
FIG. 4 is a diagram illustrating an example interface for receiving a user input for bulk adding trusted or non-trusted contacts to a phone contacts list in accordance with one or more embodiments of the present disclosure.

FIG. 4 is a diagram illustrating an example interface 400 for receiving a user input for bulk adding trusted or non-trusted contacts to a phone contacts list in accordance with one or more embodiments of the present disclosure. The interface 400 includes a button 402 for a user to press on a touch screen of a smart phone to indicate that the user would like to add trusted contacts (e.g., contacts associated with the bank Capital One to their contacts list). A button 404 may also be included for a user to press on the touch screen to indicate that the user would like to add non-trusted contacts (e.g., contact information known by an entity such as Capital One to be associated with vishing scammers or spammers). In various embodiments, the buttons 402 and 404 may be single button in which a user may indicate a desire to add both trusted and non-trusted contacts to their contacts list. As such, with the buttons 402 and 404, the indications that a user would like to add contacts to their contacts list (e.g., to prevent vishing) may be accomplished, similar to any or all of the operations 252, 256, and/or 258 of FIG. 2.

A check box 406 may also be checked by the user of the smart phone to indicate a desire that their contacts list be updated with new and/or different trusted and/or non-trusted contacts in the future. As such, a user may check the check box 406 so that the app will update their contacts list automatically (e.g., periodically, continuously) in the future. If the user unchecks or does not check the check box 406, then the contacts list may only be updated manually (e.g., upon assent by the user through the user interface in the future to update the contacts list).

FIG. 5 is a diagram illustrating an example interface 500 for receiving a user input for providing permission to an application to change and/or access a phone contacts list in accordance with one or more embodiments of the present disclosure. The interface 500 specifically provides a dialog 502 in which the user may indicate whether the downloadable app on the smart phone may access a contacts list of the smart phone (e.g., the client device). In this way, the user explicitly consents to the app adding contacts to or otherwise modifying the user's contacts list, such as discussed above with respect to the operation 254 of FIG. 2.

FIG. 6 is a diagram illustrating an example interface 600 for bulk adding trusted contacts to a phone contacts list in accordance with one or more embodiments of the present disclosure. The interface shows an example trusted contact that may be added to a client device (e.g., smartphone). The contact may have a name 602, an image 606, name and/or entity fields 608, and various numbers 610, 612, 614 associated therewith. These pieces of information may be automatically populated in the contact by, for example, the downloadable app in which the user approved the adding of contacts. The image 606 and/or contact name 602 may be selected such that, when a call is received from one of the numbers 610, 612, 614, the user will see the image 606 and/or contact name 602 displayed on their client device, such that they will know it is a trusted contact (e.g., a contact associated with the entity related to the downloadable app, the contact name 602, and/or the image 606).

Similarly, the different numbers 610, 612, 614 may have descriptions such that when those particular numbers call the client device, the client device can display the specific party related to the entity (e.g., person, department, business unit, branch location, etc.) that is calling. For example, the numbers 610, 612, and 614 are associated with the entity's customer service, fraud, and collections departments, respectively. A button 616 further allows a user to press it to add additional numbers to the contact shown in the interface 600. In various embodiments, the downloadable app may use this interface element to add new numbers to an existing contact when updating the trusted and/or non-trusted contacts in a user's phone, or such updates may happen automatically by the app communicating with the contacts list and without the use of user interface elements/functionality. A button 604 may further receive an input from a user to confirm that they would like to add the contact shown in the interface 600 to their client device. In various embodiments, the user may not press the button 604, but instead the contact may be added by the app automatically. For example, where the contact is added automatically without showing the contact interface 600 to the user during adding of the contact, the interface 600 may still be visible to the user if they select the contact in their contacts list to view. As such, the button 604 may be used to finish viewing the contact shown in the interface 600.

FIG. 7 is a diagram illustrating an example interface 700 for bulk adding non-trusted contacts to a phone contacts list in accordance with one or more embodiments of the present disclosure. Similar to the interface 600, the contact shown in the interface 700 may have a name 702, an image 704, name and/or entity fields 706, and various numbers 708 and 710 associated therewith. These pieces of information may be automatically populated in the contact by, for example, the downloadable app in which the user approved the adding of contacts. The image 704 and/or contact name 702 may be selected such that, when a call is received from one of the numbers 708 and 710, the user will see the image 704 and/or contact name 702 displayed on their client device, such that they will know it is a non-trusted contact (e.g., a contact associated with a number believed to be associated with a spammer).

Similarly, the different numbers 708 and 710 may have descriptions such that when those particular numbers call the client device, the client device can display the specific party related to the entity that is calling. For example, the numbers 708 and 710 may include labels that indicate what type of scam is associated with a given number (e.g., "Credit Card Scammer," "Login/Password Scammer," etc.). A button 712 further allows a user to press it to add additional numbers to the contact shown in the interface 700. In various embodiments, the downloadable app may use this interface element to add new numbers to an existing contact when updating the trusted and/or non-trusted contacts in a user's phone, or such updates may happen automatically by the app communicating with the contacts list and without the use of user interface elements/functionality. A button 714 may also be displayed so the user may interact with a non-trusted contact to unblock numbers associated with the contact. For example, when saving the non-trusted contact information to a device's contacts list, the downloadable app may automatically save the non-trusted contact with a setting to be blocked and/or silenced by the client device. However, the user may opt out of that by selecting the button 714. In various other embodiments, if the downloadable app does not automatically save the non-trusted contact as a contact to be blocked, the user may be able to select a button similar to the button 714, but to activate blocking and/or silencing of a call from one of the numbers in the contact shown in the interface 700.

Whether a contact being added to a client device is for a trusted contact (e.g., as shown in FIG. 6) or a non-trusted contact (e.g., as shown in FIG. 7), the contacts may have multiple numbers associated with them so as not to clutter a client device's contacts list. For example, a given single contact may have 2 or more numbers, 3 or more numbers, 4 or more numbers, 5 or more numbers, 10 or more numbers, 15 or more numbers, 20 or more numbers, 30 or more numbers, 40 or more numbers, 50 or more numbers, 60 or more numbers, 70 or more numbers, 80 or more numbers, 90 or more numbers, 100 or more numbers, etc. In this way, a large number of potentially vishing related numbers may be stored to a user's contacts list using only a single contact. In various embodiments, to the extent a contacts list is configured to have hidden or non-viewable contacts, a downloadable app may also be configured to save the trusted and/or non-trusted contacts to a contacts list but as contacts that are hidden so as to further de-clutter a user's visible contacts list.

Figure 8:
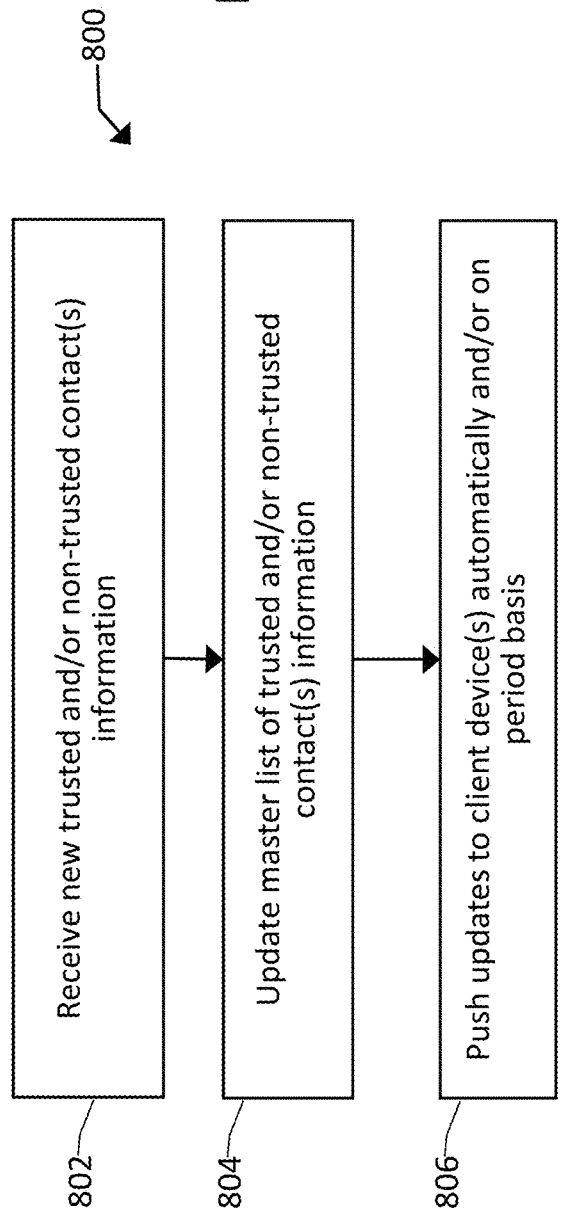
FIG. 8 is a flowchart illustrating a process for updating trusted and non-trusted contacts in a phone contacts list in accordance with one or more embodiments of the present disclosure.

FIG. 8 is a flowchart illustrating a process 800 for updating trusted and non-trusted contacts in a phone contacts list in accordance with one or more embodiments of the present disclosure. At an operation 802, new trusted and/or non-trusted contact information may be received, for example at a server such as the server 156 of FIG. 1. At an operation 804, a master list of trusted and/or non-trusted contacts maintained at the server may be updated using the newly received trusted and/or non-trusted contact information. At an operation 806, the updates and/or the entire updated master list may be pushed to client devices (e.g., the client device 152 of FIG. 1), either automatically upon the master list being updated or on a periodic basis. In various embodiments, client devices may automatically request updates to their contacts lists including trusted and/or non-trusted contacts, such that an updating of the contacts lists may be prompted by the client device rather than the server. In embodiments where the master list on a server is referred to by a client device when a call is received (e.g., the trusted and/or non-trusted contacts may be stored on the server and not on the client device), the operation 806 may be omitted, as merely updating the master list on the server will suffice to update the trusted and/or non-trusted contacts referred to and used by a client device.

In various embodiments, the phone numbers added to trusted and/or non-trusted contacts may be received via different sources. For example, an entity may receive reports from customers of certain phone numbers that are used to scam customers or otherwise participate in vishing attacks. When the entity receives such a report, they may update a master list of non-trusted contacts (e.g., as described in FIG. 8) to include the number reported by the customer. In various embodiments, non-trusted contact phone numbers may also include phone numbers similar to (e.g., one or two digits changed) legitimate telephone numbers of an entity. Scammers/spammers often use telephone numbers that are similar to those of legitimate customer service, finance, etc. departments of entities to make it harder to detect vishing attacks. As such, an entity which has known trusted contact phone numbers related to their various departments and/or employees, may generate similar phone numbers (e.g., one or two digits changed) to add to a non-trusted contact. In various embodiments, a machine learning algorithm may also be trained to recognize phone numbers likely to be spammers/scammers based on aspects of use of those numbers, such as frequency of calls, targets of calls, geographic origin of calls, etc. As such, after training an algorithm using known numbers of spammers, the machine learning algorithm may determine additional numbers that are used or likely being used by scammers/spammers for vishing attacks.

Online forums or other websites where consumers log complaints about certain spamming phone numbers may also be scraped. If one or more posts references a scam phone number is found online, those numbers may be added to a non-trusted contact. Similarly, such a web scraper may also look for people reporting scams related to a particular entity. In that way, the scraper could be used to identify phone numbers specifically being used to target customers related to that entity, so the entity can add those numbers to a non-trusted contact. Other non-trusted numbers may come from law enforcement entities, reports of crimes using particular phone numbers, or databases related to the same.

In various embodiments, a score may also be associated with a given phone number that indicates a probability that the phone number is a scammer. Such a score may be stored as part of a label in the contact information such that when a call is received from that number, a user may see the score displayed on their phone that is indicative of how likely the call is to be from a scammer. Just like the contact numbers, names, logos, labels, etc. the scores may be updated over time so that as confidence goes up or down that a phone number is associated with a scammer, a client device may have more up to date information. Such a score may also be calculated using a machine learning algorithm. For example, known trusted and non-trusted phone numbers may be used to train a machine learning algorithm, and then unknown phone numbers input into a trained algorithm may be output with a confidence score indicating how likely the number is to be trusted or non-trusted.

In various embodiment, the systems, methods, and computer readable media described herein may also apply for scams and spammers that use text messages such as short messaging service (SMS) or multimedia messaging service (MMS) messages. By storing the contact information as described herein, text messages from non-trusted contacts may be silenced, blocked, or at least identified using labels stored in the contacts list as described herein. As such, both phone call and text message scams may be reduced and/or prevented according to the embodiments described herein.

As such, described herein are systems, methods, and computer readable media for bulk downloading both contact information known to be safe and contact information suspected to be dangerous (e.g., associated with vishing attacks) to client devices, so that the client devices themselves may be used to prevent vishing attacks. The contact information may be stored as contacts with numerous phone numbers associated so that large numbers of phone numbers may be stored as non-trusted, for example, without cluttering up a user's contacts list. The contacts may also be updated over time so that as trusted and/or non-trusted contacts change over time, the client device's contacts list may be updated accordingly.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Figure 9:
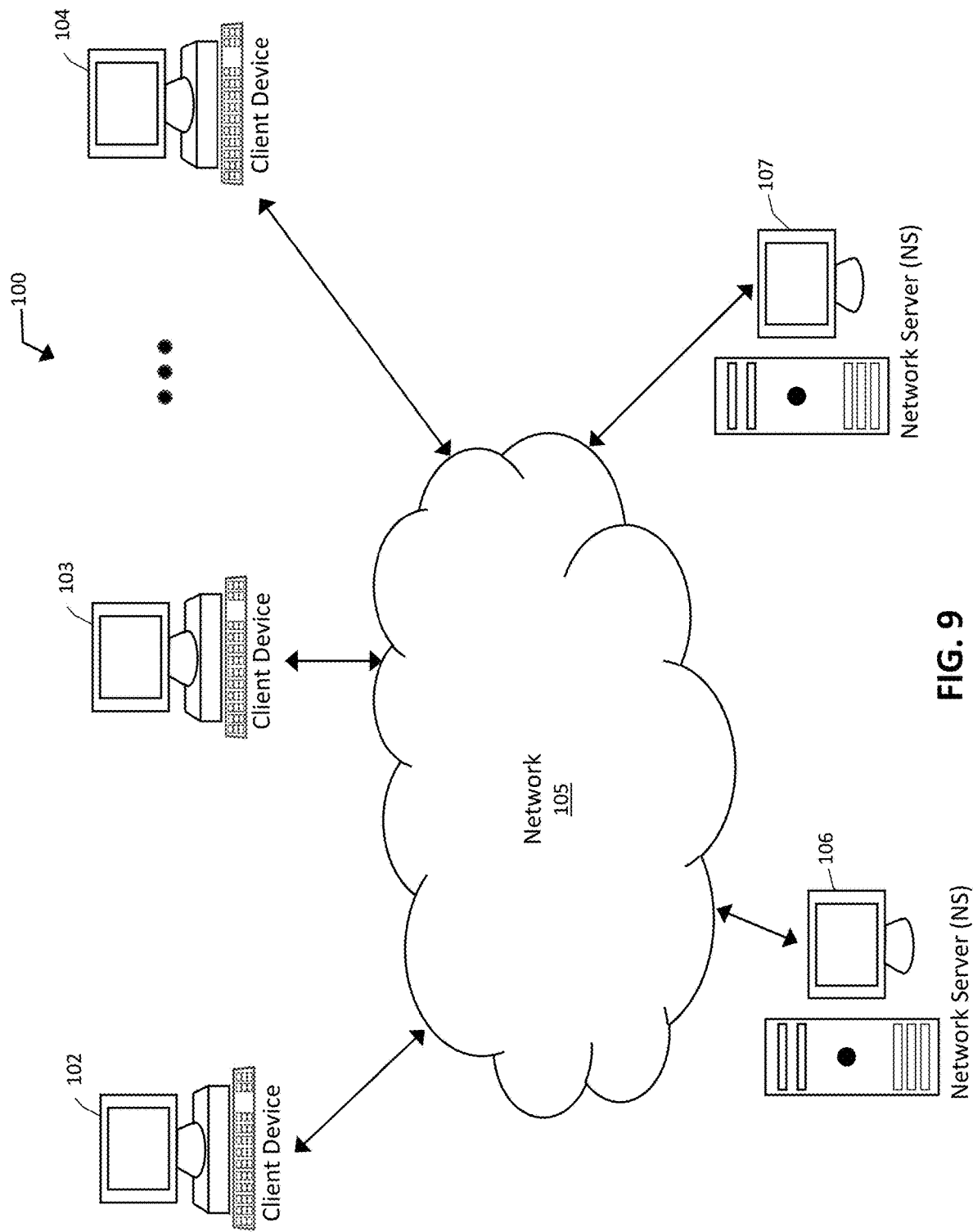
FIG. 9 is a block diagram depicting a computer-based system and platform in accordance with one or more embodiments of the present disclosure.

FIG. 9 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 9, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
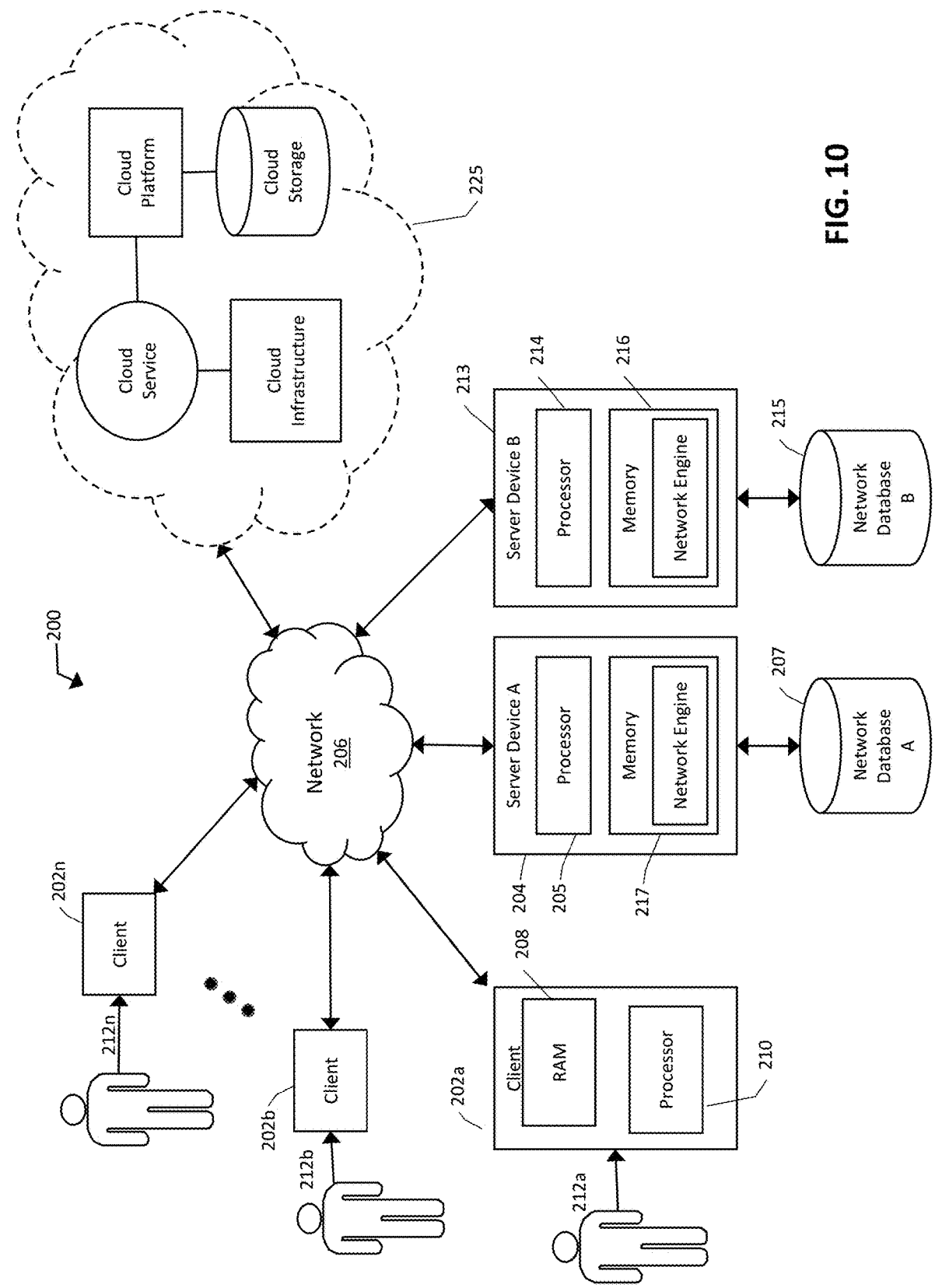
FIG. 10 is a block diagram depicting another computer-based system and platform in accordance with one or more embodiments of the present disclosure.

FIG. 10 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices/clients 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of devices/client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices/clients 202a through 202n may also comprise a number of external or internal devices such as a mouse, a CD-ROM, DVD, a physical or virtual keyboard, a display, or other input or output devices. In some embodiments, examples of member computing devices/clients 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices/clients 202a through 202n may be specifically programmed with one or more application programs in accordance with one or more principles/methodologies detailed herein. In some embodiments, member computing devices/clients 202a through 202n may operate on any operating system capable of supporting a browser or browser-enabled application, such as Microsoft™, Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing clients/devices 202a through 202n, users 212a through 212n, may communicate over the exemplary network 206 with each other and/or with other systems and/or devices coupled to the network 206. As shown in FIG. 10, exemplary server devices 204 and 213 may be also coupled to the network 206, having processors 205 and 214. In some embodiments, one or more member computing devices/clients 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
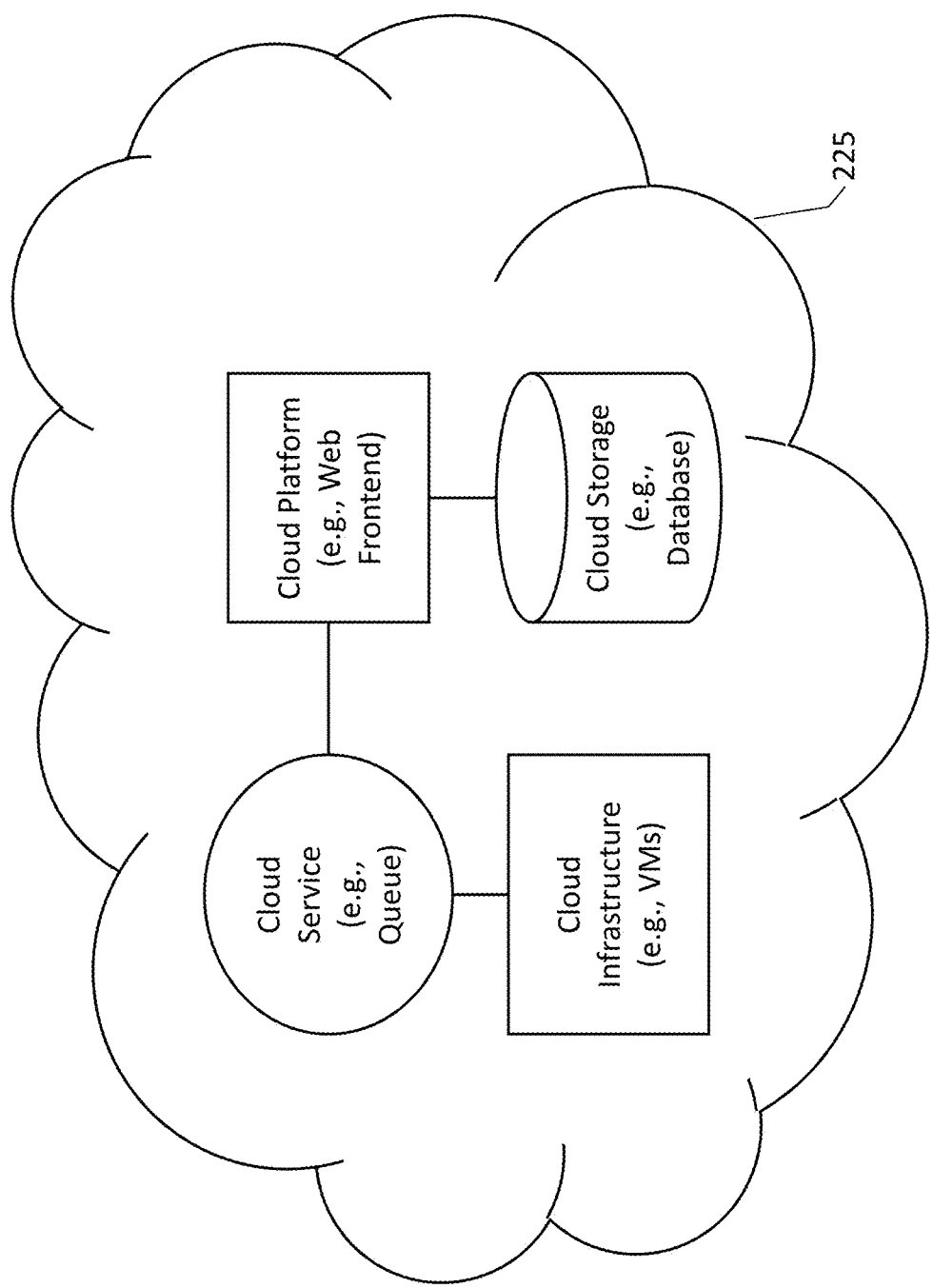
FIGS. 11 and 12 are diagrams illustrating implementations of cloud computing architecture/aspects with respect to which the disclosed technology may be specifically configured to operate, in accordance with one or more embodiments of the present disclosure.
Figure 12:
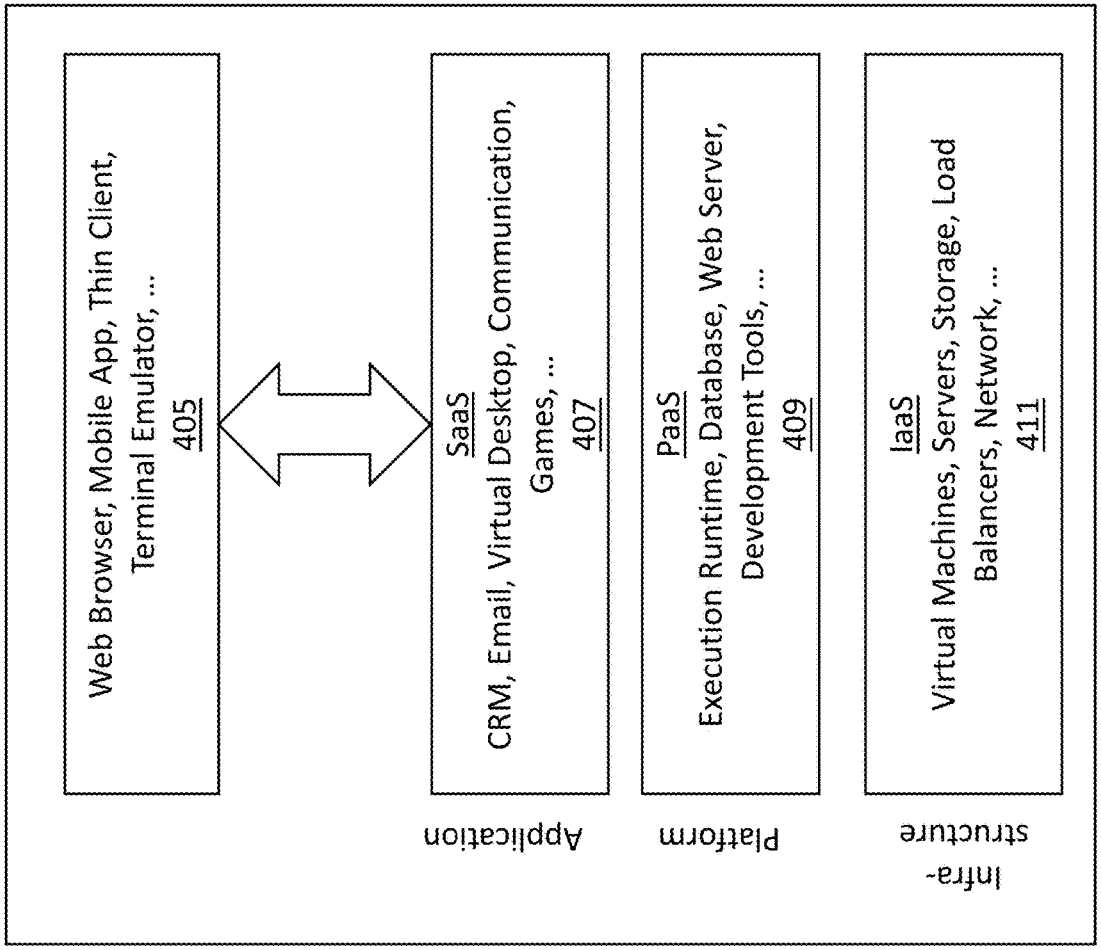

As also shown in FIGS. 10-12, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 12, the exemplary inventive computer-based systems/platforms, the exemplary inventive computer-based devices, components and media, and/or the exemplary inventive computer-implemented methods of the present disclosure (e.g., computing clients/devices 202a through 202n and/or applications thereon such as a web browser, mobile app, thin client, terminal emulator 405, etc.) may be specifically configured to operate in or with cloud computing/architecture such as, but not limiting to: infrastructure a service (IaaS) 411, platform as a service (PaaS) 409, and/or software as a service (SaaS) 407. FIGS. 11 and 12 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

At least some aspects of the present disclosure will now be described with reference to the following numbered clauses.

1. A method comprising:
    generating, by one or more processors of a computer system, a set of non-trusted contacts, each contact of the set of non-trusted contacts corresponding to contact information believed to be associated with vishing attacks; and
    sending, by the one or more processors, the set of non-trusted contacts to a computing device of a user, wherein the computing device is configured to:
    add the set of non-trusted contacts to a contacts list of the computing device, the contacts list being associated with an audio calling functionality of the computing device,
    receive a call and determine that the call is from a caller associated with a contact in the set of non-trusted contacts, and
    silence the call, block the call, or display caller information of the contact based on the determination that the call is from the caller associated with second contact in the set of non-trusted contacts.
2. The method of clause 1, further comprising generating, by the one or more processors, a set of trusted contacts, each contact of the set of trusted contacts corresponding to legitimate contact information associated with an entity associated with the computing system.
3. The method of clause 2, further comprising storing, by the one or more processors, the set of trusted contacts and the set of non-trusted contacts at one or more electronic storage devices, wherein the set of trusted contacts and the set of non-trusted contacts are configured to be updated at the one or more electronic storage devices.

4. The method of clause 3, further comprising:
updating, by the one or more processors, the set of trusted contacts stored at the one or more electronic storage devices by deleting at least one contact of the set of trusted contacts or adding at least one new contact to the set of trusted contacts; and
sending, by the one or more processors to the computing device, an updated set of trusted contacts or information indicative of the updating of the set of trusted contacts.

5. The method of clause 3, further comprising:
updating, by the one or more processors, the set of non-trusted contacts stored at the one or more electronic storage devices by deleting at least one contact of the set of non-trusted contacts or adding at least one new contact to the set of non-trusted contacts; and
sending, by the one or more processors to the computing device, an updated set of non-trusted contacts or information indicative of the updating of the set of non-trusted contacts.

6. The method of clause 5, wherein the sending of the updated set of non-trusted contacts or the information indicative of the updating occurs automatically without receiving data indicative of a user request to update the set of non-trusted contacts from the computing device.

7. The method of clause 5, further comprising receiving, by the one or more processors from the computing device, data indicative of a user request to update the set of non-trusted contacts, wherein the sending of the updated set of non-trusted contacts or the information indicative of the updating occurs based on the receiving of the data indicative of the user request.

8. The method of clause 2, wherein the set of trusted contacts comprises multiple telephone numbers configured to be stored as a single contact in the contacts list of the computing device.

9. The method of clause 8, wherein the set of trusted contacts further comprises information identifying each of the multiple telephone numbers as being associated with one of a plurality of business units or departments of the entity.

10. The method of clause 9, wherein the computing device is configured to display one of the information identifying each of the multiple telephone numbers based on whenever an incoming call to the computing device is received from one of the multiple telephone numbers.

11. The method of clause 1, wherein the set of non-trusted contacts comprises multiple telephone numbers configured to be stored as a single contact in the contacts list of the computing device.

12. The method of clause 11, wherein the set of non-trusted contacts further comprises an image indicating that a call is from an illegitimate entity configured to be stored as an associated image with the single contact in the contacts list of the computing device.

13. The method of clause 12, wherein the computing device is configured to display the image whenever an incoming call to the computing device is received from one of the multiple telephone numbers stored as the single contact in the contacts list.

14. An apparatus comprising:
a memory; and
at least one processor coupled to the memory, the at least one processor configured to:
receive a set of trusted contacts and a set of non-trusted contacts, wherein:
each contact of the set of trusted contacts corresponds to legitimate contact information associated an entity associated with a computing device from which the set of trusted contacts and the set of non-trusted contacts is received, and
each contact of the set of non-trusted contacts corresponds to contact information not associated with the entity;
add the set of trusted contacts and the set of non-trusted contacts to a contacts list of the apparatus stored in the memory, the contacts list being associated with an audio calling functionality of the apparatus,
receive a first call and determine that the first call is from a first caller associated with a contact in the set of trusted contacts,
display first caller information of the first contact based on the determination that the first call is from the first caller associated with the contact in the set of trusted contacts,
receive a second call and determine that the second call is from a second caller associated with a contact in the set of non-trusted contacts, and
silence the second call, block the second call, or display second caller information of the contact in the set of non-trusted contacts based on the determination that the second call is from the second caller associated with the contact in the set of non-trusted contacts.

15. A non-transitory computer readable medium having instructions stored thereon that, upon execution by a computing system, cause the computing system to perform operations comprising:
generating a set of trusted contacts, each contact of the set of trusted contacts corresponding to legitimate contact information associated with an entity associated with the computing system;
generating a set of non-trusted contacts, each contact of the set of non-trusted contacts corresponding to contact information not associated with the entity;
storing the set of trusted contacts and the set of non-trusted contacts at one or more electronic storage devices, wherein the set of trusted contacts and the set of non-trusted contacts are configured to be updated at the one or more electronic storage devices; and
sending the set of trusted contacts and the set of non-trusted contacts to a computing device of a user, wherein the computing device is configured to:
add the set of trusted contacts and the set of non-trusted contacts to a contacts list of the computing device, the contacts list being associated with an audio calling functionality of the computing device,
receive a first call and determine that the first call is from a first caller associated with a first contact in the set of trusted contacts,
display first caller information of the first contact based on the determination that the first call is from the first caller associated with the first contact in the set of trusted contacts, receive a second call and determine that the second call is from a second caller associated with a first contact in the set of non-trusted contacts, and silence the second call, block the second call, or display second caller information of the second contact based on the determination that the second call is from the second caller associated with the second contact in the set of non-trusted contacts.

16. The non-transitory computer readable medium of clause 15, wherein the operations further cause the computing system to perform operations comprising receiving, from the computing device, data indicative of a user input granting permission to store the set of trusted contacts and the set of non-trusted contacts in the contacts list of the computing device.

17. The non-transitory computer readable medium of clause 15, wherein the set of non-trusted contacts comprises multiple telephone numbers configured to be stored as a single contact in the contacts list of the computing device.

18. The non-transitory computer readable medium of clause 17, wherein the set of non-trusted contacts further comprises an image indicating that a call is from an illegitimate entity configured to be stored as an associated image with the single contact in the contacts list of the computing device.

19. The non-transitory computer readable medium of clause 15, wherein the set of trusted contacts comprises multiple telephone numbers configured to be stored as a single contact in the contacts list of the computing device.

20. The non-transitory computer readable medium of clause 19, wherein the set of trusted contacts further comprises an image indicating that a call is from the entity configured to be stored as an associated image with the single contact in the contacts list of the computing device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 11 and 12) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   generating, by one or more processors of a computer system, a set of non-trusted contacts, each contact of the set of non-trusted contacts corresponding to contact information believed to be associated with at least one vishing attack;
   receiving, by the one or more processors, a permission to alter a contacts list application executed by a computing device of a user; and
   sending, by the one or more processors in response to receiving the permission, the set of non-trusted contacts to the computing device to be added to the contacts list application, wherein the computing device is configured to:

associate the contacts list application with an audio calling functionality of the computing device, determine that a received call is from a caller associated with a contact in the set of non-trusted contacts in the contacts list application, and silence the call, block the call, or display caller information of the contact based on the determination that the call is from the caller associated with the contact in the set of non-trusted contacts.

2. The method of claim 1, further comprising generating, by the one or more processors, a set of trusted contacts, each contact of the set of trusted contacts corresponding to legitimate contact information associated with an entity associated with the computer system.

3. The method of claim 2, further comprising storing, by the one or more processors, the set of trusted contacts and the set of non-trusted contacts at one or more electronic storage devices, wherein the set of trusted contacts and the set of non-trusted contacts are configured to be updated at the one or more electronic storage devices.

4. The method of claim 3, further comprising:

updating, by the one or more processors, the set of trusted contacts stored at the one or more electronic storage devices by deleting at least one contact of the set of trusted contacts or adding at least one new contact to the set of trusted contacts; and sending, by the one or more processors to the computing device, an updated set of trusted contacts or information indicative of the updating of the one or more electronic storage devices set of trusted contacts.

5. The method of claim 3, further comprising:

updating, by the one or more processors, the set of non-trusted contacts stored at the one or more electronic storage devices by deleting at least one contact of the set of non-trusted contacts or adding at least one new contact to the set of non-trusted contacts; and sending, by the one or more processors to the computing device, an updated set of non-trusted contacts or information indicative of the updating of the set of non-trusted contacts.

6. The method of claim 5, wherein the sending of the updated set of non-trusted contacts or the information indicative of the updating occurs automatically without receiving data indicative of a user request to update the set of non-trusted contacts from the computing device.

7. The method of claim 5, further comprising receiving, by the one or more processors from the computing device, data indicative of a user request to update the set of non-trusted contacts, wherein the sending of the updated set of non-trusted contacts or the information indicative of the updating occurs based on the receiving of the data indicative of the user request.

8. The method of claim 2, wherein the set of trusted contacts comprises multiple telephone numbers configured to be stored as a single contact in the contacts list application executed by the computing device.

9. The method of claim 8, wherein the set of trusted contacts further comprises information identifying each of the multiple telephone numbers as being associated with one of a plurality of business units or departments of the entity.

10. The method of claim 9, wherein the computing device is configured to display one of the information identifying each of the multiple telephone numbers based on whenever an incoming call to the computing device is received from one of the multiple telephone numbers.

11. The method of claim 1, wherein the set of non-trusted contacts comprises multiple telephone numbers configured to be stored as a single contact in the contacts list application executed by the computing device.

12. The method of claim 11, wherein the set of non-trusted contacts further comprises an image indicating that a call is from an illegitimate entity configured to be stored as an associated image with the single contact in the contacts list application executed by the computing device.

13. The method of claim 12, wherein the computing device is configured to display the image whenever an incoming call to the computing device is received from one of the multiple telephone numbers stored as the single contact in the contacts list application.

14. An apparatus comprising:

a memory; and at least one processor coupled to the memory, the at least one processor configured to:

receive a set of trusted contacts and a set of non-trusted contacts, wherein:

each contact of the set of trusted contacts corresponds to legitimate contact information associated an entity associated with a computing device from which the set of trusted contacts and the set of non-trusted contacts is received, and each contact of the set of non-trusted contacts corresponds to contact information not associated with the entity;

add the set of trusted contacts and the set of non-trusted contacts to a contacts list application executed by the apparatus stored in the memory after receiving a permission to alter the contacts list application from a user of the apparatus, the contacts list application being associated with an audio calling functionality of the apparatus;

receive a first call and determine that the first call is from a first caller associated with a first contact in the set of trusted contacts;

display first caller information of the first contact based on the determination that the first call is from the first caller associated with the first contact in the set of trusted contacts;

receive a second call and determine that the second call is from a second caller associated with a second contact in the set of non-trusted contacts; and silence the second call, block the second call, or display second caller information of the second contact in the set of non-trusted contacts based on the determination that the second call is from the second caller associated with the second contact in the set of non-trusted contacts.

15. A non-transitory computer readable medium having instructions stored thereon that, upon execution by a computing system, cause the computing system to perform operations comprising:

generating a set of trusted contacts, each contact of the set of trusted contacts corresponding to legitimate contact information associated with an entity associated with the computing system;

generating a set of non-trusted contacts, each contact of the set of non-trusted contacts corresponding to contact information not associated with the entity;

storing the set of trusted contacts and the set of non-trusted contacts at one or more electronic storage devices, wherein the set of trusted contacts and the set of non-trusted contacts are configured to be updated at the one or more electronic storage devices; and sending the set of trusted contacts and the set of non-trusted contacts to a computing device of a user, wherein the computing device is configured to:
- add the set of trusted contacts and the set of non-trusted contacts to a contacts list application executed by the computing device after receiving a permission to alter the contacts list application from a user of the computing device, the contacts list application being associated with an audio calling functionality of the computing device,
- receive a first call and determine that the first call is from a first caller associated with a first contact in the set of trusted contacts,
- display first caller information of the first contact based on the determination that the first call is from the first caller associated with the first contact in the set of trusted contacts,
- receive a second call and determine that the second call is from a second caller associated with a first contact in the set of non-trusted contacts, and
- silence the second call, block the second call, or display second caller information of the second contact based on the determination that the second call is from the second caller associated with the second contact in the set of non-trusted contacts.

16. The non-transitory computer readable medium of claim 15, wherein the set of non-trusted contacts comprises multiple telephone numbers configured to be stored as a single contact in the contacts list application executed by the computing device.

17. The non-transitory computer readable medium of claim 16, wherein the set of non-trusted contacts further comprises an image indicating that a call is from an illegitimate entity configured to be stored as an associated image with the single contact in the contacts list application executed by the computing device.

18. The non-transitory computer readable medium of claim 15, wherein the set of trusted contacts comprises multiple telephone numbers configured to be stored as a single contact in the contacts list application executed by the computing device.

19. The non-transitory computer readable medium of claim 18, wherein the set of trusted contacts further comprises an image indicating that a call is from the entity configured to be stored as an associated image with the single contact in the contacts list application executed by the computing device.

* * * * *